3,352,705
METHOD OF PRODUCING A WATER RESISTANT PIGMENTED COATING ON PAPER OR PAPERBOARD, AND THE PAPER OR PAPERBOARD THUS OBTAINED
Geert Moes, Hoogezand, and Antonius Hendrik Zijderveld, Veendam, Netherlands, assignors to W. A. Scholten's Chemische Fabrieken N.V., Groningen, Netherlands, a corporation of the Netherlands
No Drawing. Filed Dec. 22, 1965, Ser. No. 515,732
Claims priority, application Netherlands, Jan. 31, 1961, 260,654
12 Claims. (Cl. 117—62.2)

This invention relates to a method of producing an improved water-resistant amylaceous pigment coating on paper and paperboard and to paper and paperboard coated therewith.

This application is a continuation-in-part of our copending application Ser. No. 168,822, filed Jan. 25, 1962, and now abandoned.

In the literature methods are described in which starch is esterified by heating in the presence of an amide and an inorganic acid, such as phosphoric acid or sulfamic acid or salts of these acids.

Thus it is known from U.S. Patent 2,857,377 to prepare a sulfate ester of starch by heating starch with sulfamic acid and an amide in the presence of less than 50% of moisture at temperatures up to 300° C. The amide employed in this method is preferably urea.

According to German Patent 851,180, the phosphate content of the starch is increased by heating potato starch with phosphoric acid and urea in the presence of minor quantities of moisture. It may be assumed that in this case a phosphate ester of starch is formed.

As a result of the hydrophilic sulfate and phosphate group introduced and the considerable hydrolysis of the starch caused by this treatment, the products obtained are characterized by an exceptionally high solubility in water, which is far greater than the solubility of the traditional thin-boiling starches known in the art. Accordingly, the products are excellently suitable for applications in which a good solubility is of great importance, e.g. as thickening agents for textile printing purposes.

Surprisingly, it has now been found that such conversion products, obtained by hydrolyzing starch with an inorganic acid in the presence of urea, can be rendered water-insoluble by treating the same with aldehydes or with melamine-aldehyde precondensates and that they are eminently suitable for being used in the process of pigment coating of paper and paperboard. The invention has accordingly for its object a method of applying a water-resistant amylaceous pigment coating to paper or paperboard, which comprises applying to said paper or paperboard a pigmented aqueous solution of a starch derivative, obtained by hydrolyzing starch at a temperature of between 60 and 300° C., with an inorganic acid in the presence of urea and less than 50% of water, calculated on the weight of the mixture to such an extent that a 25% aqueous solution of the same has an apparent viscosity not lower than 10 centipoises at 25° C., and reacting said starch derivative with an aldehyde reagent capable of rendering the same insoluble, selected from the group consisting of aldehydes, aldehyde donors and melamine-aldehyde precondensates, the pH during the insolubilization reaction being from about 6 to about 9.

We preferably use a conversion product, in which the starch is hydrolyzed to such an extent that a 25% solution of the product has an apparent viscosity ranging from 10–1500 centipoises at 25° C. Conversion products having this viscosity show the desired properties as regards stability, flow, penetration, etc. The apparent viscosity is measured by means of a Fann V–G viscometer, model 35 (Fann Instrument Corporation, Houston, Tex.), at a rate of shear of 480 sec.$^{-1}$.

The treatment with the aldehyde compound may be effected in various manners.

According to one embodiment of the invention the starch conversion product and the aldehyde reagent are incorporated in one single coating composition and the paper treated with the same is subsequently dried at a temperature which is dependent on the aldehyde reagent used and may vary from 20 to 200° C. whereby the starch coating becomes insoluble. This method has the disadvantage that the viscosity of the treating bath under acid conditions is liable to increase to such an extent that the mass is no longer workable. Other factors which play a part in this respect are, the extent of modification and the concentration of the starch product and the nature and the quantity of the aldehyde compound.

When, however, the pH of the coating composition is from about 6 to about 9, the pot-life of the coating composition is very good and a workable viscosity is maintained for a long time. Optimum pH values are for instance for formaldehyde pH=6.0, for glyoxal pH=7.0 and for methylated trimethylolmelamine pH=7.0. If the coating composition including the aldehyde reagent is kept at these pH values, the pot-life at normal working temperatures is several days, while the water-resistance of the dried coating is surprisingly good.

According to a second embodiment of the invention (which however, is less preferred) the paper is first treated with an aqueous pigmented solution of the starch conversion product, whereupon the paper at a pH from about 6 to about 9 is treated with the aldehyde reagent, if desired after being dried. Although it is possible to perform this treatment by contacting the carrier with a gaseous aldehyde it is generally preferred to treat the carrier with an aqueous solution of the aldehyde compound. This may be done by applying the solution of the aldehyde compound to the treated paper surface by spraying, by means of rollers or the like. The paper is then dried at a temperature of 20 to 200° C.

For obtaining sufficiently water-resistant deposits, about 5–50% of aldehyde compound, calculated on the starch conversion product, is used. Preferred amounts of insolubilizing agents are: for formaldehyde 15–20%, for glyoxal 10% and for melamine-aldehyde precondensates 5–10%.

The invention is of particular value for producing water-resistant printing paper, but it may be used for other purposes e.g. for producing washable wallpaper.

In the conventional manufacturing processes of coated paper, a pigment must be bonded to the paper by means of a binding agent, e.g. on the basis of casein, soya-alpha-protein, synthetic polymers, or starch. If the coated paper is printed in offset, the unprinted portions being moistened with water, the coating must be water-resistant. In case of an insufficient water-resistance the binding agent is apt to get softened, as a consequence of which the pigment will be partly taken up by the rubber cloth, so that poor prints are obtained and the machine must often be stopped for cleaning. One of the major drawbacks of the conventional binding agents on starch basis, in contrast with casein is, that starch products such as starch modified with acid, oxidants or enzymes, dextrinated starch and starch ethers or esters, cannot be made water-resistant by a simple treatment.

In the past various reactants have been added to products on starch basis, in order to make them more or less water-resistant, e.g. urea formaldehyde resins, potassium pyroantimonate and chromium stearyl chloride. As a matter of fact these substances actually render the starch water-resistant to a certain extent, but the use of these known starch products in combination with these reactants, also has some disadvantages. In addition to causing a sufficient water-resistancy, a binding agent for coated papers should satisfy many other requirements, i.e. with respect to the water-retention of the ready coating composition, the binding power of the binding agent, patterning on the coated paper and the plasticity of the coating. The aforementioned combinations of traditional starch products with insolubilizing reactants are inadequate in one or more of these respects.

It has now been found that the starch conversion products used according to the invention for the manufacture of water-resistant coated paper have i.e. the following advantages over the binding agents on starch basis previously used.

(1) WATER-RETENTION

In case of insufficient water-retention, the binding agent penetrates too much into the interior of the paper, as a result of which on the one hand the pigments are insufficiently bonded, and on the other hand the capillary system of the coating and the paper base is disturbed. As a result the intensity of the print and the drying of the printing inks are adversely affected. When using urea formaldehyde resins, pyroantimonate or chromium stearyl chloride the water-retention is thus adversely affected, at the cost of the printing properties of the paper obtained. When using the products according to the invention this drawback does not occur.

(2) BINDING POWER

When the binding power of the binding agent is higher, a smaller quantity of the agent will be required. As an excess of binding agent tends to cause blocking of the paper pores and adversely affects the drying of the ink, binding agents of great binding power are desirable. The products according to the invention have favourable properties in this respect.

(3) PATTERNING

In each roll coating process the coated paper will show a marking, caused by the film being split up between the roll and the paper. The rheological properties of the coating compositions prepared from the products according to the invention are such that no or substantially no patterning occurs.

(4) PLASTICITY

The plasticity of the coating of the paper must be as high as possible, so that it remains pliable, and the contact between the paper and the printing form is ensured at all time. This requirement, which is especially of importance to letterpress-printing and gravure-printing is entirely met by the products according to the invention.

(5) WATER-RESISTANCE

The coated paper according to the invention is made water-resistant by a simple treatment with an aldehyde compound at a pH from about 6 to about 9. This reaction does not require particularly high temperatures, as compared to the reactions for producing water-resistant coatings by means of urea-formaldehyde resins or potassium pyroantimonate. Furthermore, the treatment with an aldehyde reagent is effected in a pH-range which is more convenient for the printer. In the case of ureaformaldehyde resins a pH in the acid range is an essential condition for a successful reaction; as a result of the acidity of the coating, the siccatives will however be inactivated, so that the printing ink will fail to dry. Also, the troublesome hardening, which occurs when using ureaformaldehyde resins or potassium pyroantimonate, and results in a crystalline coating, which produces prints of inconstant quality, and the equally troublesome dusting of the coating do not occur with the papers coated in accordance with the invention.

Suitable pigments for the present purpose are e.g. paper-coating clays, calcium carbonate and titanium dioxide. We may also use any of the additives commonly employed in coating paper. Among these are:

Dispersants, such as polyphosphates;
Lubricants, such as stearates, wax emulsions, and so on;
Foam control agents, such as silicone emulsions;
Preservatives, such as quaternary ammonium compounds phenolic-type compounds, and so on;
Latices, such as butadiene-styrene, butadiene-acrylonitrile, acrylic emulsions, and so on.

It is recommended to carry out the pH adjustment of the coating composition before the addition of the aldehyde reagent, in such a way that the final pH of the coating composition is from about 6 to about 9. For this purpose sodium or ammonium hydroxide may be used. The coating compositions may be applied to the paper by means of known equipment, such as size-press, multiple roll, blade, air-knife coaters, etc.

The starch products to be rendered insoluble according to the invention may be obtained by heating native starches of any known type with an inorganic acid and urea, e.g. corn starch, waxy maize starch, potato starch, sago starch, wheat starch, tapioca starch and rice starch. The starch may be reacted with the inorganic acid and the urea in the original, non-gelatinized condition, but also in gelatinized form. Instead of native starches we may also subject to the heating treatment starches modified by acids, enzymes or oxidants and dextrins or chemical derivatives of starch, provided said derivatives have substantially maintained their starch character. If the conversion product of starch, urea and an inorganic acid is ungelatinized, it may be transformed in a dry, gelatinized product by passing an aqueous suspension or dispersion of the treated starch over heated revolving drums or by subjecting a dispersion to spray drying.

The starch products to be used for the present invention are preferably prepared with sulfamic acid or phosphoric acid or with a mixture of these acids. It is also possible to use these acids or their salts in a mixture with other inorganic acids, such as sulfuric acid, hydrochloric acid or nitric acid, and it has been found that it is even possible to use the last-mentioned acids alone.

The proportions of reactants used for the preparation of the starch conversion products may be varied. We may use about 1–20% of inorganic acid and 5–50% by weight of urea, both calculated on the starch used. The ratio of the proportions of the urea and the inorganic acid is preferably 1–8 parts by weight of urea to 1 part by weight of inorganic acid. In general, the heat treatment, which is carried out at temperatures of 60–300° C., involves a considerable break-down of the starch, so that thin boiling products are obtained.

Depending on the method by which they are prepared the starch conversion products obtained are dispersible in boiling water and sometimes in cold water, and the dispersions thus obtained are used in the present method.

Suitable aldehydes are e.g. monoaldehydes, such as formaldehyde and butyraldehyde, dialdehydes, such as glyoxal, methylglyoxal, glutaraldehyde and α-hydroxyadipaldehyde and aldehyde polymers, such as paraformaldehyde. We may also use aldehyde donors, which are substances capable of forming aldehydes under the reaction conditions, such as hexamethylenetetramine or monomethylol dimethyl hydantoin.

Suitable melamine-aldehyde precondensates for the purpose of the present invention are methylol derivates or formaldehyde resins of melamine or substituted melamines, e.g. stearylmelamine. Preferably alkylated melamine-aldehyde precondensates are used, such as the methylated or butylated methylolmelamines. The precondensates should be water soluble, or be water dispersible, with or without the aid of a dispersing agent.

The invention will be elucidated by the following examples, the parts being by weight.

Example 1

An aqueous dispersion of 20 parts of the starch conversion product described below in 210 parts of water is added to a suspension of 100 parts of china clay in 44 parts of water, containing 0.3 part of sodium hexametaphosphate. The pH of the resultant coating composition is adjusted to 7.0. The mixture contains approximately 32% of dry material. For the same purpose three further similar mixtures are made with 10, 15 and 20 parts respectively of a 30% glyoxal solution, the pH in each case being adjusted to 7.

Mechanical woodpaper is provided with an 0.08 mm. coating of these mixtures by means of a wire-wound doctor blade, whereupon the treated paper is allowed to dry at room temperature. The coatings made with the glyoxal-containing coating compositions are very water-resistant, contrary to the coatings obtained with mixtures without glyoxal.

The starch conversion product referred to above is prepared by mixing 5000 parts of potato starch with 1000 parts of water in which 750 parts of urea and 300 parts of 89% phosphoric acid are dissolved. The moist mixture is then pre-dried at a temperature of 50–55° C. to a moisture content of about 15%, whereupon the mixture is heated at 130° C. for one hour. A 25% solution in water of the starch conversion product thus prepared has an apparent viscosity of 781 centipoises at 25° C.

Example 2

Starting from a suspension containing 75 parts of calcium carbonate, 425 parts of china clay and 1.5 parts of sodium hexametaphosphate in 1500 parts of water and a dispersion of 100 parts of a starch conversion product in 400 parts of water, a coating composition containing 40% of dry material is prepared. The pH of the coating composition is adjusted to 6.0.

This coating composition is applied to semi-sized wood-free offset paper, by means of a sizing press and dried, the weight of the paper being increased by 16 g./m.$^2$.

The paper is then treated with 1 g./m.$^2$ of formaldehyde for each side, by spraying 3.5 g./m.$^2$ of a neutralized 30% aqueous formaldehyde solution on the coated paper. The paper thus obtained has a coating of excellent print receptive characteristics and is highly water-resistant both after being dried at room temperature and at a temperature of 105° C.

For the preparation of the starch conversion product 1000 parts of tapioca starch are mixed with 200 parts of water, 150 parts of urea, 60 parts of 89% phosphoric acid and 10 parts of 10 N sulfuric acid. The moist mixture is pre-dried at 50–55° C. for three hours, and subsequently heated to 125° C. for one hour. A 25% solution of the resultant product has an apparent viscosity of 521 centipoises at 25° C.

Example 3

A dispersion of 20 parts of a starch conversion product in 60 parts of water is added to a mixture of 525 parts of chalk and 335 parts of water. To the resultant paste 10 parts of monomethylol dimethyl hydantoin are added, the pH being adjusted to 9.0. The coating is applied to a paper base for wall paper by means of a doctor blade. After drying at 85° C. the wet rub of the paper thus treated is tested with the wet finger test. The paper turns out to be excellently suitable as washable wall paper.

The conversion product used is prepared from corn starch, urea and sulfamic acid in accordance with Example VI of U.S. Patent 2,857,377. A 25% solution of the conversion product has an apparent viscosity of 634 centipoises at 25° C.

Example 4

A starch derivative is prepared by mixing and heating potato starch with 18% urea and 12% phosphoric acid, until a 25% solution in water of the reaction product has a viscosity of 550 centipoises at 25° C. A clay slurry is made by mixing 90 parts of china clay, 10 parts of calcium carbonate and 0.3 part of sodium tetrapyrophosphate with 50 parts of water. Into this slurry a solution of 20 parts of the starch derivative in 40 parts of water is blended, after which 0.5 part of calcium stearate are added and the pH is adjusted to 7.0. 2.5 parts of an 80% aqueous syrup of a partially methylated trimethylolmelamine are then added. The coating composition is applied with a multiple roll coater to a non-rosin sized paper, in an amount of 17 g./m.$^2$ of dry substance on each side. The coated paper is passed through the drier section of the paper machine and reaches during this passage a temperature of about 90° C. Thereupon the coated paper is supercalendered. The coating of the paper is characterized by an excellent water-resistance, a high brightness and a high gloss. The printing properties, especially for sheet fed and multicolor web fed offset printing are outstanding.

Example 5

Example 4 is repeated, but instead of the methylated trimethylolmelamine 2 parts of a commercial grade of dimethylolmelamine are incorporated in the coating composition.

Although the dimethylolmelamine causes a slight increase of the viscosity of the coating composition the working properties of the same are not impaired. The wet rub resistance of the coated paper is slightly less than that obtained in Example 4, but still far above the minimum level necessary for offset printing. The other coating and printing properties of the paper are excellent.

Example 6

Example 4 is repeated, but instead of the methylated trimethylolmelamine 2.5 parts of a partially butylated polymethylolmelamine are dispersed in the coating composition.

The coated paper thus obtained is characterized by a high plasticity which is very valuable for the subsequent printing process.

Example 7

Example 4 is repeated, but 5 parts of the starch derivatives are replaced by 10 parts of a 50% butadiene-styrene latex and 1.8 parts instead of 2.5 parts of methylated trimethylolmelamine (80%) are used. A waterproof coated paper of high printing quality is obtained.

Example 8

A coating composition containing 45% of solids is made from 150 parts of water, 100 parts of china clay, 0.3 part of sodium hexametaphosphate, 25 parts of the starch derivative described in Example 2 and 2.5 parts of glyoxal. The pH of the coating composition is adjusted to 7.0.

The coating is applied to an offset grade base rawstock by means of a size-press, whereupon the paper is dried and calendered.

The coated paper thus obtained has a very good wet rub resistance and excellent printing properties.

We claim:
1. A method of producing a water resistant amylaceous pigment coating on paper or paperboard which comprises applying to said paper or paperboard a pigmented aqueous solution of a starch derivative, obtained by hydrolyzing starch at a temperature of between 60 and 300° C with an inorganic acid in the presence of urea in an amount of from 5 to 50% by weight calculated on the basis of starch used and less than 50% of water, calculated on the weight of the mixture, to such an extent that a 25% aqueous solution of the starch derivative has an apparent viscosity not lower than 10 centipoises at 25° C., and reacting said starch derivative with an aldehyde reagent capable of rendering the same insoluble, said aldehyde reagent being selected from the group consisting of aldehydes, aldehyde donors and melamine-aldehyde pre- condensates and the pH during the insolubilization reaction being from about 6 to about 9.

2. A method according to claim 1, in which the paper or paperboard is treated with a coating composition, containing both the pigmented aqueous solution of the starch derivative and the aldehyde reagent, and is subsequently dried at a temperature of from 20 to 200° C.

3. A method according to claim 1, in which the paper or paperboard is first treated with the pigmented aqueous solution of the starch derivative and subsequently treated with the aldehyde reagent, the paper so coated being then dried at a temperature of from 20 to 200° C.

4. A method according to claim 1, in which a starch derivative is used in which the starch is hydrolyzed to such an extent that a 25% solution of the starch derivative has an apparent viscosity in the range of 10 to 1500 centipoises at 25° C.

5. A method according to claim 1, in which the inorganic acid is phosphoric acid.

6. A method according to claim 1, in which the inorganic acid is sulfamic acid.

7. A method according to claim 1, in which the aldehyde is formaldehyde.

8. A method according to claim 1, in which the aldehyde is glyoxal.

9. A method according to claim 1, in which the aldehyde donor is monomethylol dimethyl hydantoin.

10. A method according to claim 1, in which the melamine precondensate is an alkylated methylolmelamine.

11. Coated paper or paperboard provided with a deposit of pigment particles which are bound to each other and to the surface of the paper or paperboard by an insoluble reaction product of a starch derivative, obtained by hydrolyzing starch at a temperature of between 60 and 300° C. with an inorganic acid in the presence of urea in an amount of from 5 to 50% by weight calculated on the basis of starch used and less than 50% of water, calculated on the weight of the mixture, to such an extent that a 25% aqueous solution of the same has an apparent viscosity in the range of 10 to 1500 centipoises at a temperature of 25° C., and an aldehyde reagent selected from the group consisting of aldehydes, aldehyde donors and melamine-aldehyde precondensates, the insolubilization reaction being at a pH of from 6 to 9.

12. A method according to claim 1, in which the inorganic acid is phosphoric acid and the aldehyde reagent is a member of the group consisting of aldehydes and aldehyde donors.

References Cited

UNITED STATES PATENTS

| | | |
|---|---|---|
| 2,212,314 | 8/1940 | Bauer. |
| 2,246,635 | 6/1941 | Moller et al. _____ 260—233.3 X |
| 2,304,818 | 12/1942 | Grupe _____ 117—64 X |
| 2,549,177 | 8/1951 | Davidson _____ 260—233.3 X |
| 2,632,714 | 3/1953 | Loomer _____ 117—83 X |
| 2,836,591 | 5/1958 | Durand _____ 260—233.3 |
| 2,852,493 | 9/1958 | Smith et al. _____ 260—233.3 X |
| 2,857,377 | 10/1958 | Martin _____ 260—233.5 |
| 2,879,268 | 3/1959 | Jullander _____ 260—233.3 X |
| 2,880,107 | 3/1959 | Robinette _____ 106—213 X |
| 2,968,581 | 1/1961 | Kress _____ 260—233.3 X |
| 2,999,030 | 9/1961 | Roderer _____ 106—213 X |
| 2,999,032 | 9/1961 | Dekker. |
| 3,019,120 | 1/1962 | Bauer et al. _____ 106—213 |
| 3,036,935 | 5/1962 | Lolkema et al. __ 260—233.3 XR |
| 3,101,330 | 8/1963 | Paschall et al. ____ 106—210 XR |
| 3,127,393 | 3/1964 | Thayer _____ 260—233.3 |

ALEXANDER H. BRODMERKEL, *Primary Examiner.*

J. H. WOO, *Assistant Examiner.*